United States Patent [19]

Bonavia

[11] Patent Number: 5,138,884
[45] Date of Patent: Aug. 18, 1992

[54] VIBROACOUSTICALLY COUPLED TESTING SYSTEM

[75] Inventor: Ward Bonavia, Islip, N.Y.

[73] Assignee: Quantum Simulation Systems, Inc., Bay Shore, N.Y.

[21] Appl. No.: 579,554

[22] Filed: Sep. 10, 1990

[51] Int. Cl.$^5$ .............................................. G01M 3/32
[52] U.S. Cl. ........................................ 73/662; 73/665
[58] Field of Search ................. 73/570, 571, 662, 665, 73/666, 668, 865.6

[56] References Cited

U.S. PATENT DOCUMENTS

| | | | |
|---|---|---|---|
| 3,123,728 | 3/1964 | Kreiskorte | 310/19 |
| 3,425,266 | 2/1969 | Klinger et al. | 73/668 |
| 4,112,776 | 9/1978 | Ouellette et al. | 73/665 |
| 4,164,151 | 8/1979 | Nolan et al. | 73/663 |
| 4,181,029 | 1/1980 | Talbott, Jr. | 73/665 |
| 4,222,455 | 9/1980 | Lerwill | 181/121 |
| 4,440,026 | 4/1984 | Kimball | 73/663 |
| 5,039,228 | 8/1991 | Chalmers | 73/571 |

Primary Examiner—Hezron E. Williams
Assistant Examiner—Louis M. Arana
Attorney, Agent, or Firm—Dilworth & Barrese

[57] ABSTRACT

A vibroacoustically coupled test system is provided utilizing acoustic technology combined with fluid dynamics to create a multipurpose dynamic environmental simulation system for use in geological, commercial, medical, military and marine testing and evaluation. The system comprises a support structure interconnected with a reactive surface through which acoustic energy is propagated to simulate environmental conditions. The acoustic energy is generated by a vibration transducer assembly and function generator. Isolators may also be used as reactive support structure for base plates having test structure mounted thereon.

18 Claims, 5 Drawing Sheets

VIBROACOUSTICALLY COUPLED TESTING SYSTEM

BACKGROUND OF THE INVENTION

1. Field of the Invention

The present invention relates to testing system for subjecting objects to vibrational conditions. More particularly, this invention is directed to vibroacoustically coupled testing systems for subjecting various types of structures, devices and/or subjects to simulated environmental vibrational conditions.

2. Description of Related Art

Vibration testing is important to many technologies, as for example, testing building structures, aircraft, vehicles and components of all kinds. Testing techniques have become increasingly precise and are extended to deal with problems in such fields as the design of machines, medical diagnostics/treatments and electronic component reliability.

Numerous vibrational testing systems are known in the art for evaluating various structures and devices. In particular, the screening and testing of assembled electronic and mechanical devices and components for defects in design make extensive use of such systems.

One such testing system is the mechanical shake table. This system utilizes a mechanical vibratory system such as, for example, a crank mechanism connected to a mounting table for imparting a single frequency vibration to a test object along a single axis of operation. Such systems are limited in their capabilities because variations and adjustments in vibrational amplitude are usually made at rest and, depending on the size of the test object, are extremely costly and expensive to operate. Such systems are typically unable to adapt to changes in ambient conditions including temperature and humidity resulting in considerable adaptive or maintenance requirements.

In another known type of shake table, electrodynamic means are utilized to accelerate the mounting table and the test object affixed thereon to produce a range of amplitude and frequency necessary for testing. While these systems are more readily adjustable, they are still quite expensive to purchase and maintain.

A further vibrational testing system known in the art makes use of voice coil technology to subject a test object to a range of amplitude and frequency to simulate environmental and/or test conditions. These systems are complex, expensive and require extensive support facilities for operation and use. For example, known voice coil technology requires extensive mounting space, an existing source of high pressure air and high amperage.

Further, objects to be tested using this technology have specific load requirements which serve to limit operation and configuration changes in the testing system. Limitations on these systems include high power consumption, limited frequency range (5-2000 Hz) and low reliability during periods of continuous use.

Hydraulic testing systems also are utilized for environmental simulation. These systems have an even more limited frequency range (0-200Hz) and require similar support facilities for operation and maintenance as the voice coil technology systems. The known hydraulic testing systems typically have very high power consumption, require frequent maintenance and have low reliability under frequent usage.

Therefore, it would be highly desirable to have a vibrational test system for reliably simulating a wide variety of dynamic environmental conditions without the need for extensive support facilities and high power consumption.

Accordingly, it is one object of the present invention to provide a vibrational test system utilizing acoustic technology combined with fluid dynamics to reliably create controlled and tuned environmental dynamic conditions.

It is a further object of the present invention to provide a vibrational testing system which simulates a wide variety of dynamic conditions with relatively low power consumption and minimal space requirements.

It is also an object of the present invention to provide a vibrational testing system which subjects test objects to various dynamic conditions without the need for extensive support facilities.

These and other highly desirable and unusual results are accomplished by the present invention in a vibration test system utilizing acoustic technology combined with fluid dynamics to create an environment in which "chaotic" or random harmonic motion can be regulated and tuned.

Objects and advantages of the invention are set forth in part herein and in part will be obvious therefrom, or may be learned by practice with the invention, which is realized and attained by means of the instrumentalities and combinations pointed out in the appended claims. The invention consists of novel parts, constructions, arrangements, combinations, steps and improvements herein shown and described.

SUMMARY OF THE INVENTION

According to the present invention, a vibroacoustically coupled testing system is provided utilizing acoustic technology combined with fluid dynamics to create a multipurpose dynamic environment for use in geological, commercial, medical, military, aerospace and marine product testing and evaluation. This vibroacoustically coupled testing system achieves these and other objects by directing energy of a predetermined simulated bandwidth through a reactive surface and by electrically or mechanically adjusting the reactive surface or direction. This results in a balanced constant motion on the mounted test object or device with minimal energy exertion.

The vibroacoustically coupled testing system is entirely self-contained and requires no multiple support packages in place prior to installation. The system comprises a rigid mounting structure or place for affixing the object or device to be tested. An acoustic sound generating section is positioned below the rigid mounting structure and directs acoustic energy to the plane of the mounting structure. A fluid section is interposed between the acoustic sound generating section and in contact with the mounting structure. The fluid section provides amplification of the acoustic energy propagated toward the rigid mounting structure by the acoustic sound generating section.

An action-reaction isolation section is connected to the mounting structure and comprises an isolation material such as, for example, rubber, fluid filled chambers or spring assemblies. This isolation section serves to exert constraint motion over a predetermined frequency bandwidth and to maintain proper height for the mounting place. A balance of the exerting force and the reactive force is maintained which results in constant motion of the test object with minimal energy output.

BRIEF DESCRIPTION OF THE DRAWINGS

The accompanying drawings, referred to herein and constituting a part hereof, illustrate preferred embodiments of the apparatus of the present invention and, together with the description, serve to explain the principles of the present invention.

DETAILED DESCRIPTION OF PREFERRED EMBODIMENTS

Figure 2:
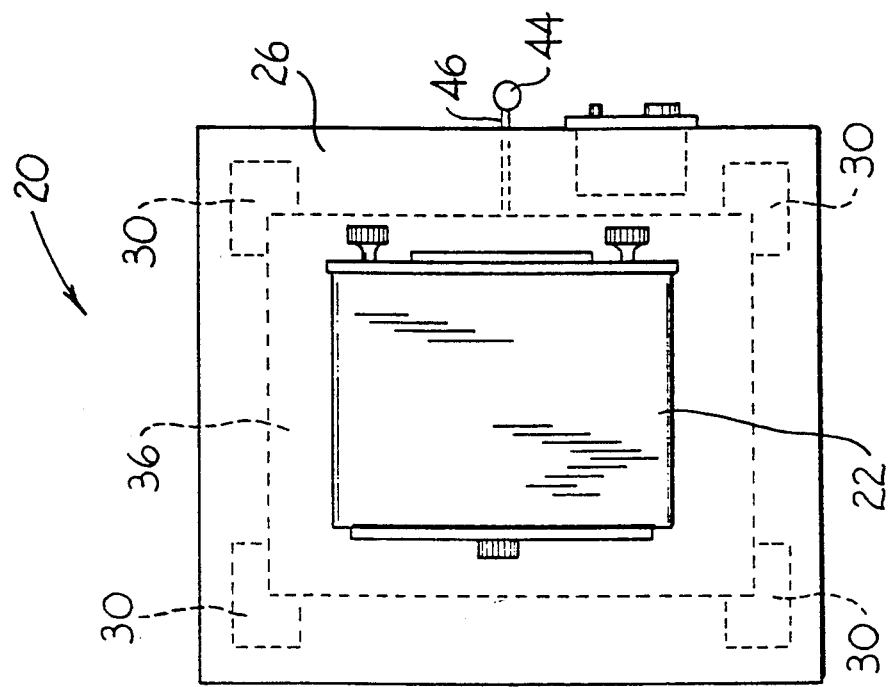
FIG. 2 is a plan view of the embodiment of FIG. 1.
Figure 1:
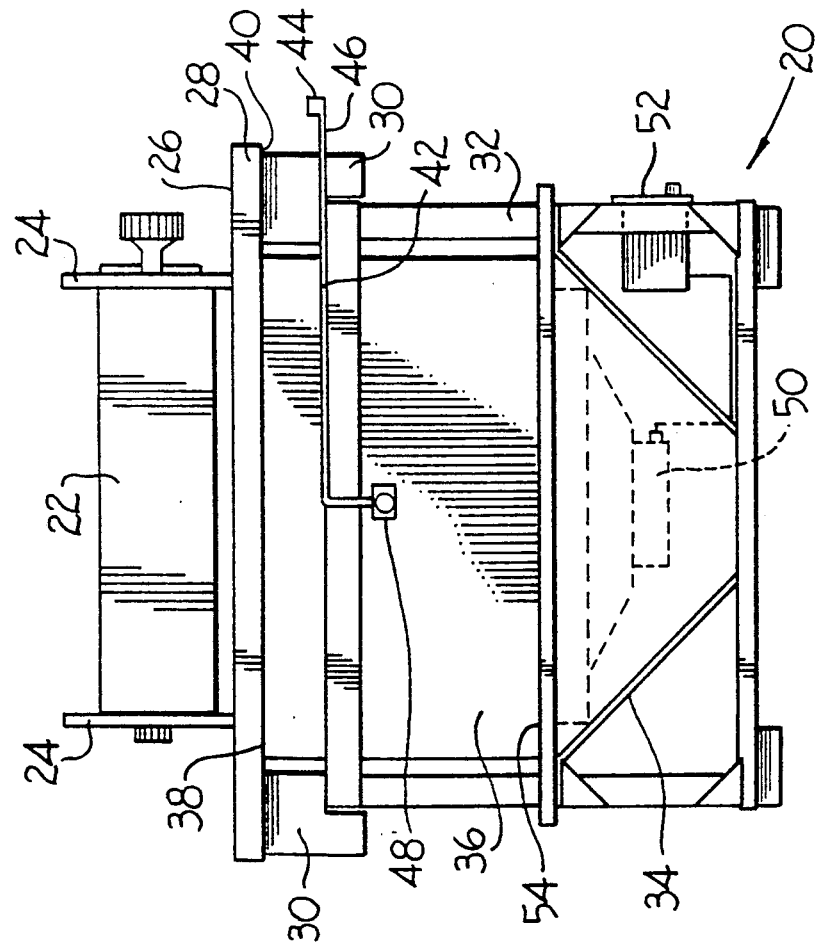
FIG. 1 is a side view of a preferred embodiment of the present invention.
Figure 5:
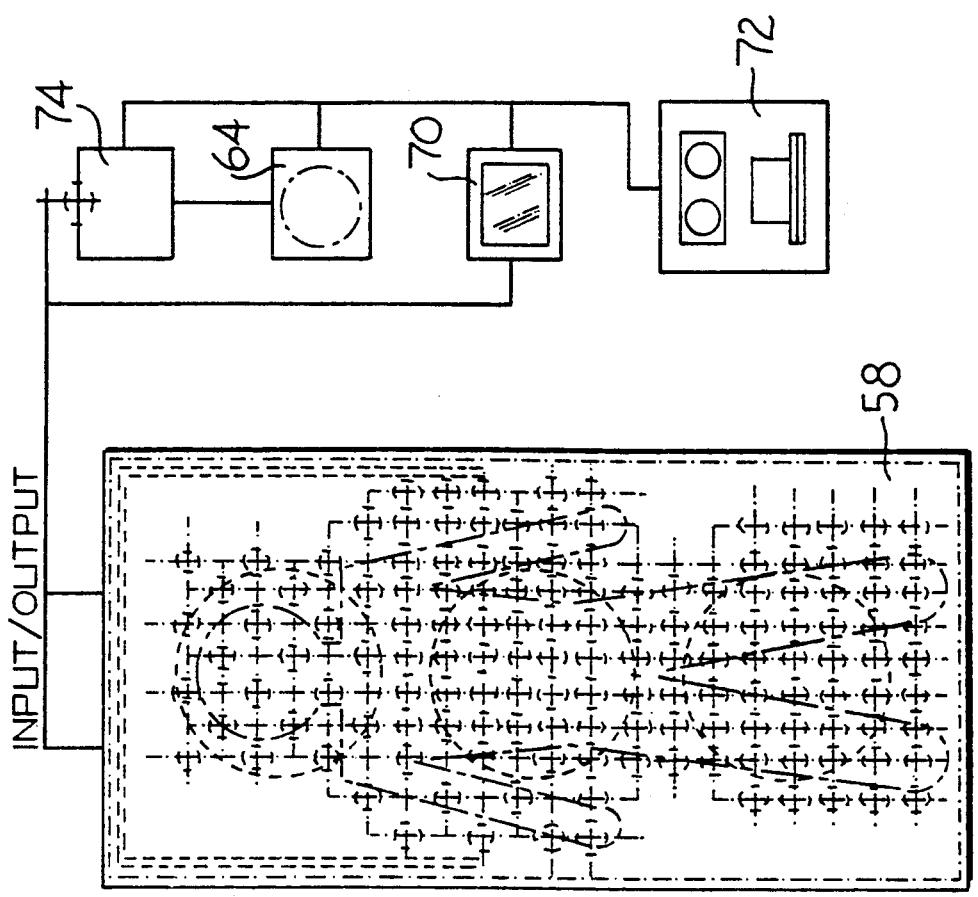
FIG. 5 is a schematic view of the embodiment of FIG. 4.

Referring to the figures, and in particular to FIGS. 1 and 2 there is shown a vibroacoustically coupled testing system 20 in accordance with one embodiment of the present invention. The machine is preferably dimensioned to adequately support the device to be subjected to vibroacoustic testing, for example, an automotive stereo 22 as shown. Mounting brackets 24 are constructed to accurately simulate the actual mounting conditions of the device in its designed installation, in this case an automobile dash board.

Mounting brackets 24 are fixed to the top 26 of base plate 28 so as to receive and transmit vibroacoustically generated energy to the device to be tested. Base plate 28 is preferably constructed of a strong supporting material such as, for example aluminum, stainless steel, stiff plastics or other equivalent material. The base plate 28 is dimensioned to adequately support the device to be tested preferably without excessive bending or flexing of the plate.

A plurality of isolators 30 serve to support the base plate 28 on top of housing 32 when the device to be tested is mounted thereon. One function of the isolators 30 is to balance and center the loaded base plate 28 in a predetermined horizontal plane at a given height above the housing 32. Isolators 30 can take a wide variety of forms including rubber or elastic structure, fluid pistons, magnetically or electrically generated fields, mechanical springs or other equivalent support technology for interactive load support. Depending on the given application, the isolators may be positioned at any location to support the loaded base plate 28. In the embodiment of FIGS. 1-2, four isolators 30 are positioned beneath the base plate 28 at the four corners thereof (FIG. 2).

Housing 32 is preferably a skeletal rigid structure for supporting the base plate 28 and the device to be tested. Materials of construction include sheet steel, plastics, etc. Depending upon the application, acoustically reflective internal baffling 34 may be provided to enhance the efficiency of the test machine. This baffling 34 may be set at angles of 20° to 90° from the horizontal plane and at right angles to other baffling. One of ordinary skill in the art would readily appreciate that variations in, inter alia, weight of the tested device and force and/or frequency of testing would affect the size, shape and distribution of the baffling to optimize the overall efficiency of the machine 20.

A fluid bladder 36 containing an interactive fluid such as, for example, water or aqueous solutions, oils, etc. is supported within housing 32 such that a top surface 38 of the fluid bladder 36 is in contact with the bottom surface 40 of the base plate 28. The fluid bladder 36 is preferably formed of an elastic rubber type material which is capable of containing the interactive fluid without substantial deterioration under testing conditions or reaction with the fluid. The choice of size and thickness of the bladder is within the knowledge of one skilled in the art and may vary depending on loading, testing conditions and/or axes of intended forces as well as frequency response desired. The choice of fluid will also be within the knowledge of one skilled in the art given the specific tests conditions to be simulated. Primarily, a fluid which will not change state substantially under testing conditions is chosen. For example, where test conditions require extreme temperature ranges, a fluid such as high altitude turbo oil or its equivalent would be selected to avoid evaporation, freezing or boiling.

In the embodiment shown in FIGS. 1-2 an optional fill mechanism 42 is shown. This fill mechanism 42 comprises a spout 44 connected to the fluid bladder 36 by means of a conduit 46. A one-way valve 48 is positioned in line with the fill mechanism 42 to permit filling of the fluid bladder 36 while avoiding back migration of the fluid out of the conduit 46. Alternatively, the fluid may be hermetically sealed within the fluid bladder 36 effectively eliminating the need for a fill mechanism 42.

Acoustic sound generating means are positioned within the housing 32 adjacent and in close proximity to the fluid bladder 36. In the embodiment of FIGS. 1-2, the acoustic sound generating means comprises a vibration transducer assembly of the speaker or horn type 50 coupled to a function generator 52 for generating fixed and/or random waveforms. Vibration transducers of this type are utilized because of their relatively light voice coil mass which do not require a large driving signal at higher frequencies. Therefore, a high signal-to-noise ratio can be maintained over a given frequency range.

The function generator 52 may be an audio-frequency oscillator adapted for driving the vibration transducer assembly over a frequency range limited only by the capabilities of the source generator. Typical function generators appropriate to the present vibroacoustically coupled test system include the Model 2511 Vibration Controller from Genrad Corporation, The Hewlett-Packard Dynamics Controller/Analyzer Model No. 5427A from Hewlett-Packard Corp., or Model No. SD-1201-2 Digital Spectrum Controller from Spectral Dynamics Corporation.

Amplifiers and/or sound synthesizers such as, for example a Pioneer Model GS 2000 or Casio CZI also may be used Similarly, accelerometers, charge amplifiers and sound and frequency analyzers may be incorporated for control or monitoring functions or for monitoring intensity or frequency response. Typical accelerometers include the Columbia 512-TX while sound and frequency amplifiers available from Ivie Electronics are readily usable. Typically amplifiers, either internal or external, are used to provide minimal wattage with low distortion for sinusoidal or random sound propagation in a wide range of power spectral density (PSD) ($0.003 - \infty +/- 0.003$ db PSD).

In the embodiment shown in FIGS. 1-2, speaker 50 is positioned directly below fluid bladder 36 and is in contact with the bottom surface of the fluid bladder 54. Where frequencies in the range of 5 to 40 Hz are being generated the contact between the bottom surface of the fluid bladder 54 and the speaker 50 is preferably air tight to improve efficiency and avoid energy loss.

In operation, function generator 50 is set to generate vibroacoustic energy which, after propagation throughout the fluid bladder 36 will simulate desired test conditions on the base plate 28. By changing the phase of the sound generation, both parallel and perpendicular motion can be achieved. Isolators 30 exert constraint motion over the side frequency bandwidth of, for example, 0.1–50K Hz. The resulting balance of the acoustically generated exerting force and the reactive or constraint force results in a constant motion of test loads with minimal energy output.

Figure 3:
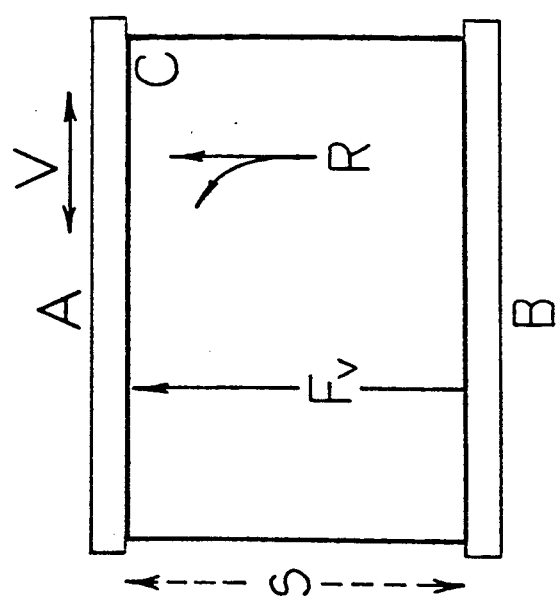
FIG. 3 is a schematic view of the operation of the vibroacoustically coupled test system.
Figure 4:
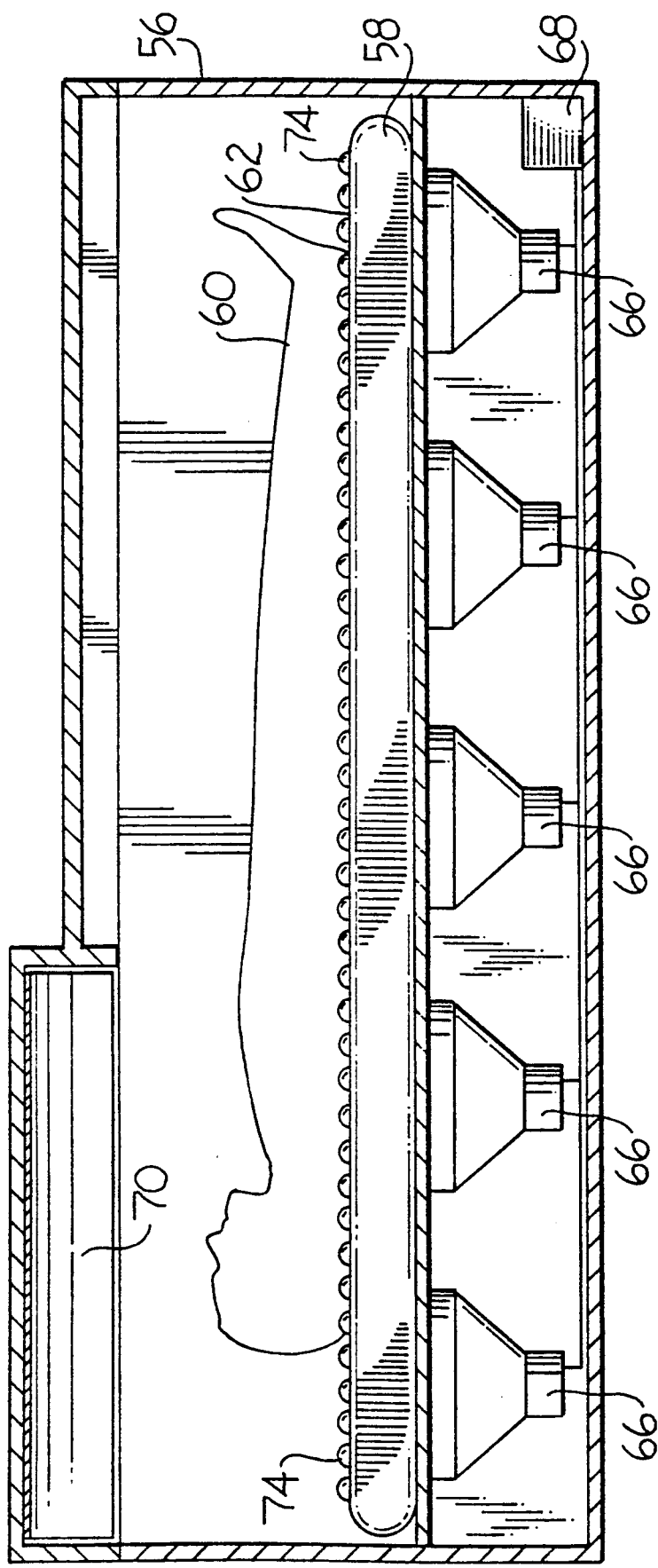
FIG. 4 is a side view of a vibroacoustically coupled test system in accordance with another embodiment.
Figure 7:
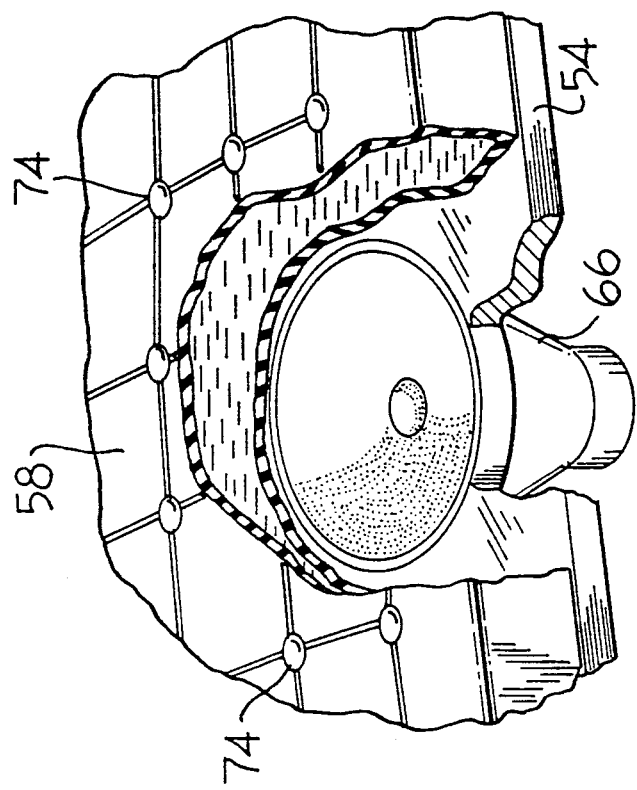
FIGS. 6-9 show components of the vibroacoustically coupled test system of FIG. 4.
Figure 6:
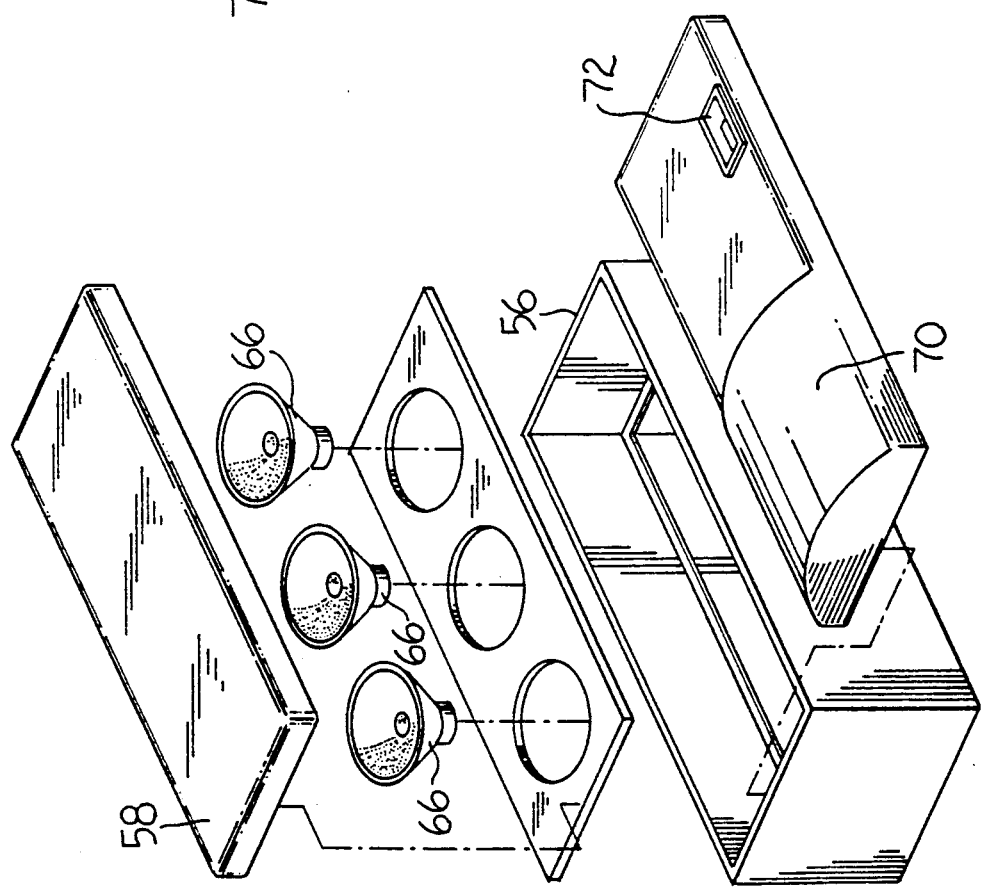
Figure 9:
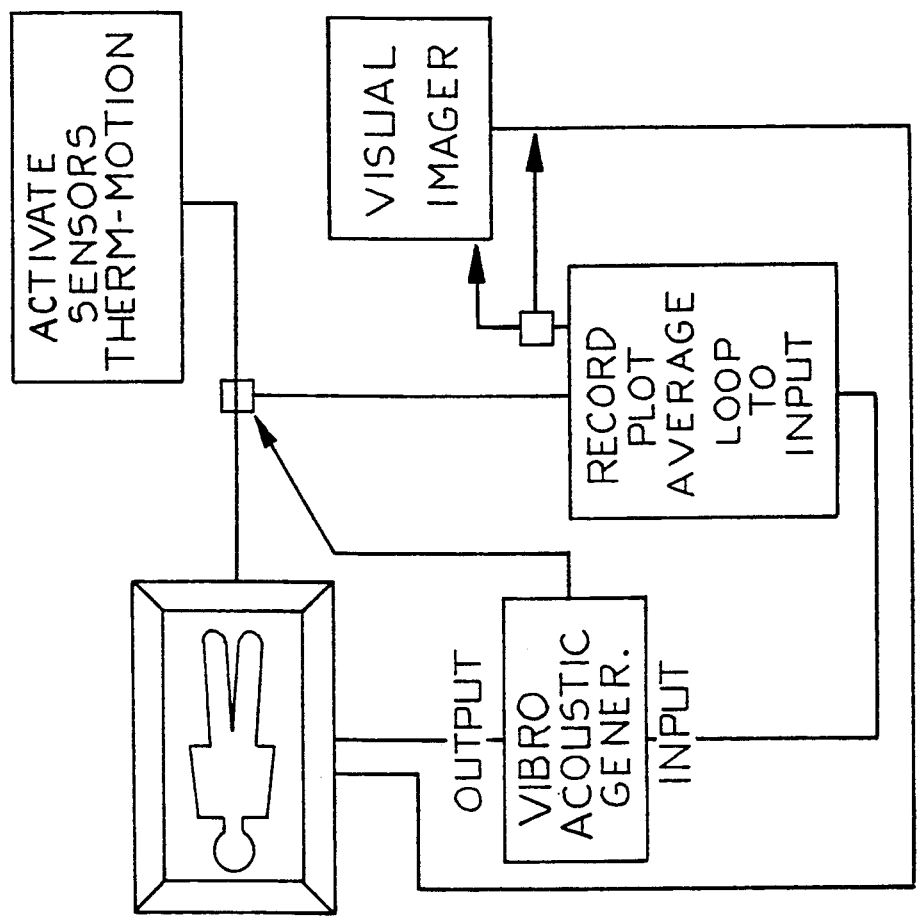
Figure 8:
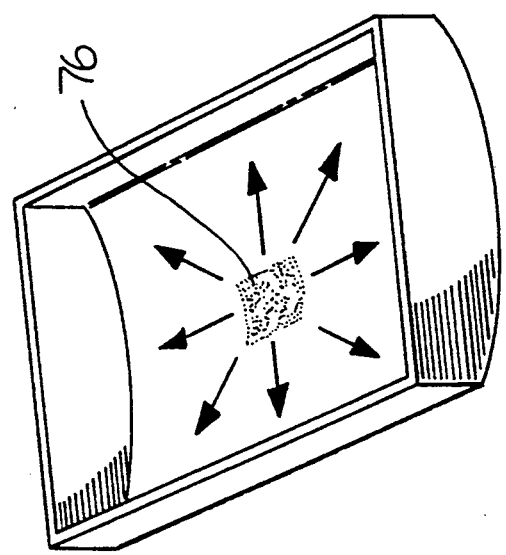

Referring to FIG. 3, a force ($F_v$) is required to maintain a solid (A), i.e. base plate 28 with a device to be tested mounted thereon, at a constant speed (v) with respect to the other surface (B), i.e., housing 32. The distribution of speeds (Pdb), i.e. random noise, results in a continuous deformation of the fluid (c) in the fluid bladder 36 from a substantially cubical shape at rest to a substantially rhomboidal shape (R). If the viscosity (s) of the fluid (c) between the surfaces (A and B) is increased, application of the same force ($F_v$) produces a greater speed of vibration (v), i.e. (v $\alpha$ s) or (v $\alpha$ freq.). Similarly, if the area of surfaces A and B increased, there is a corresponding decrease in speed (v), i.e., v $\alpha$ 1/area. An increase in force ($F_v$) produces a proportional increase in speed, i.e. (v $\alpha$ $F_v$). Therefore, the speed v is proportional to the force ($F_v$), viscosity (s) and to area (1/area) given by the equations:

$$V = F_v s/nA \text{ or } n = F_v S/AV$$

where n is a factor of fluid density and temperature or coefficient of viscosity.

FIGS. 4–9 demonstrate a particularly advantageous embodiment of the present invention for use in environmental simulation for a test subject. In this embodiment the vibroacoustically coupled test system forms an environmental simulation chamber 56. A fluid bladder 58 is positioned horizontally in the environmental simulation chamber 56 and is dimensioned to support a test subject 60. A plurality of sensors 74 including thermal and/or acceleration sensors are positioned either directly onto the top surface 62 of the fluid bladder 58 or, alternatively, may be attached directly to the test subject 60 using conventional techniques.

A vibration transducer assembly is positioned adjacent the fluid bladder 58 and includes a plurality of speakers 66 positioned at various locations proximate the fluid bladder 58 to induce acoustic energy therethrough to act on the test subject 60. Function generator 68 serves to create the sinusoidal or random wave generation as required by the particular application.

A visual image means 70 (FIG. 8) is incorporated into the environmental simulation chamber 56 in a position where it is visually apparent to the test subject 60 when disposed on the fluid bladder 58. This visual image means 70 includes conventional, high definition and/or holographic projection technologies which can be programmed in sequence or at random to vibration characteristics generated by the vibration transducer assembly 64.

Control means 72 (FIG. 9) serves to regulate monitor, adjust and or record input and output features of the vibration transducer assembly 65, sensors 74 and visual image means 70 in order to recreate predetermined conditions of sensation for the test subject. Control means 72 may include a conventional personal computer or other equivalent device programmed for the desired sequencing. For example, the environmental simulation chamber 56 can be used to evaluate personnel when subjected to simulated conditions of space or aircraft flight. To accomplish this objective, the control means is programmed for vibroacoustic energy generation for the modes of flight including initial acceleration wherein a random waveform with a frequency within the range of 5–2000 Hz is generated resulting in GRMS acceleration equal to the environment. Secondary acceleration is simulated by creating sinusoidal or random waveforms effectively canceling weight sensation through the fluid bladder 58. Following secondary acceleration, final acceleration is simulated in the same manner as the initial acceleration.

Concurrently with the vibroacoustically simulated initial, secondary and final acceleration modes, a visual projection is presented to the subject using conventional, high definition and/or holographic technology 76 corresponding to the modes of acceleration. Similarly, the sensors 74 monitor and record sensory response characteristics, for example, heat rate, blood pressure, respiration, brain waves, etc. and can be used to adjust the program to achieve predetermined simulation characteristics; to evaluate subjects for interactive or reactive response; and to modify reactions results for test subjects while continually updating and adjusting signal information. Climate control means may also be included to simulate conditions of temperature, humidity, etc. The climate control means is controlled by the control means to coordinate desired conditions.

To the extent not already indicated, it also will be understood by those of ordinary skill in the art that numerous other applications for this invention are envisioned and that any one of the various specific embodiments herein described and illustrated may be further modified to incorporate the features shown in other of the specific embodiments.

The invention in its broader aspects therefore is not limited to the specific embodiments herein shown and described but departures may be made therefrom within the scope of the accompanying claims without departing from the principles of the invention and without sacrificing its chief advantages.

What is claimed is:

1. A vibroacoustically coupled test system comprising:
   acoustic sound generating means;
   a fluid filled bladder proximate said acoustic sound generating means for receiving and propagating acoustic sound therethrough;
   mounting means for mounting a device to be tested, said mounting means being in contact with said fluid filled bladder to receive acoustic sound propagated therethrough; and
   isolator means contacting said mounting means for exerting constraint motion thereto.

2. A vibroacoustically coupled test system as in claim 1 wherein said acoustic sound generating means comprises a vibration transducer assembly coupled to a function generator.

3. A vibroacoustically coupled test system as in claim 1 wherein said acoustic sound generating means is sealed to said fluid filled bladder.

4. A vibroacoustically coupled test system as in claim 1 wherein said isolation means comprises a plurality of isolator blocks supporting said mounting means in contacting relation.

5. A vibroacoustically coupled test system as in claim 1 wherein said isolator means comprises at least one fluid piston.

6. A vibroacoustically coupled test system as in claim 1 wherein said isolator means comprises electrically generated fields.

7. A vibroacoustically coupled test system as in claim 1 wherein said isolator means comprises at least one spring assembly.

8. A vibroacoustically coupled test system as in claim 1 wherein said isolator means comprises magnetically generated fields.

9. A vibroacoustically coupled test system comprising:
   a housing;
   acoustic sound generating means within said housing;
   a fluid filled bladder mounted within said housing in contacting relation to said acoustic sound generating means for receiving and propagating acoustic sound therethrough;
   mounting means for mounting a device to be tested, said mounting means contacting said fluid filled bladder opposite said acoustic sound generating means for receiving propagated acoustic sound through said fluid filled bladder and isolator means positioned between said housing and said mounting means for supporting said mounting means in contact with said fluid filled bladder and exerting constraint motion on said mounting means.

10. A vibroacoustically coupled test system as in claim 9 further comprising internal reflective baffling proximate said acoustic sound generating means.

11. A vibroacoustically coupled test system as in claim 9 wherein said fluid filled bladder further comprises a fill mechanism for maintaining the fluid level within said fluid filled bladder.

12. A vibroacoustically coupled test system as in claim 9 wherein said acoustic sound generating means comprises a vibration transducer assembly coupled to a function generator.

13. A vibroacoustically coupled test system as in claim 10 wherein said baffling is set at angles of approximately 20° to 90° from a horizontal plane.

14. A vibroacoustically coupled test system as in claim 12 further comprising a sound synthesizer in cooperation with said transducer and generator for modifying the output of said transducer.

15. A vibroacoustically coupled test system as in claim 9 further comprising an accelerometer for limiting the overall response from vibrational input.

16. A vibroacoustically coupled test system as in claim 9 further comprising a sound analyzer for limiting the overall response from vibrational input.

17. A method for vibroacoustically testing structure comprising the steps of:
   supporting structure to be tested in vibrational contact with a fluid filled bladder;
   generating acoustic sound through said fluid filled bladder to impart vibrational motion to said structure; and
   controlling said vibrational motion to induce sinusoidal or random vibrational motion to said structure.

18. A method for vibroacoustically testing structure as in claim 17 comprising the further step of analyzing and readjusting said acoustic sound to vary conditions on said structure.

* * * * *